June 27, 1967
R. R. ROUGH
3,328,150
APPARATUS FOR BLENDING MOLTEN GLASS
Filed April 22, 1963
3 Sheets-Sheet 1
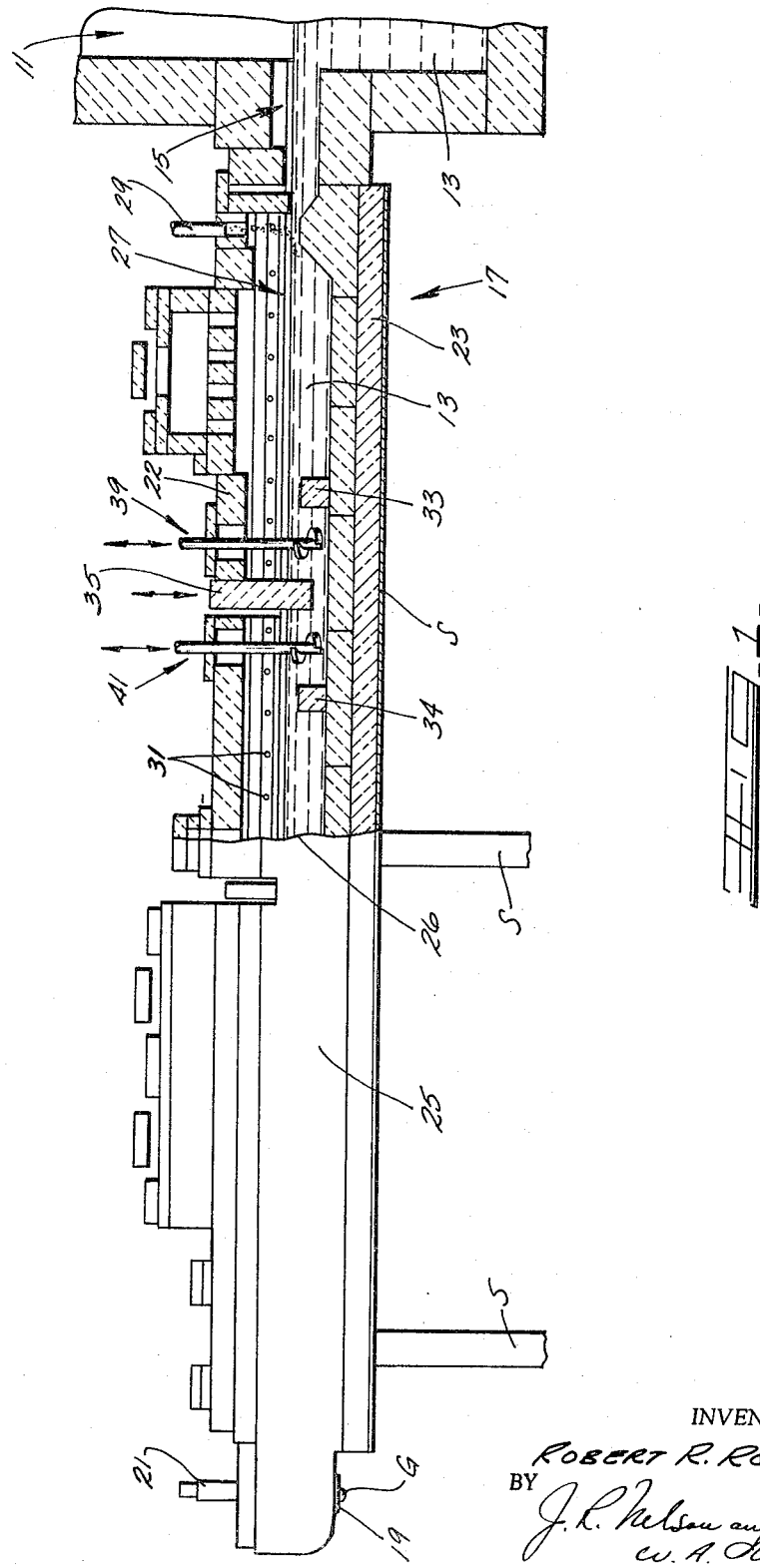
INVENTOR.
ROBERT R. ROUGH
BY
J. R. Nelson and
W. A. Scheich
ATTORNEYS June 27, 1967  R. R. ROUGH  3,328,150
APPARATUS FOR BLENDING MOLTEN GLASS
Filed April 22, 1963  3 Sheets-Sheet 2
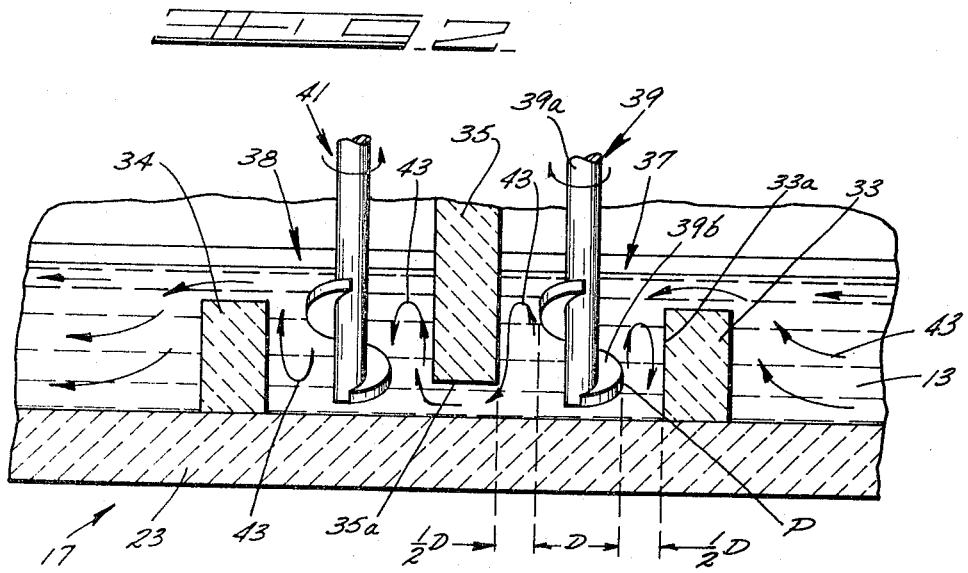
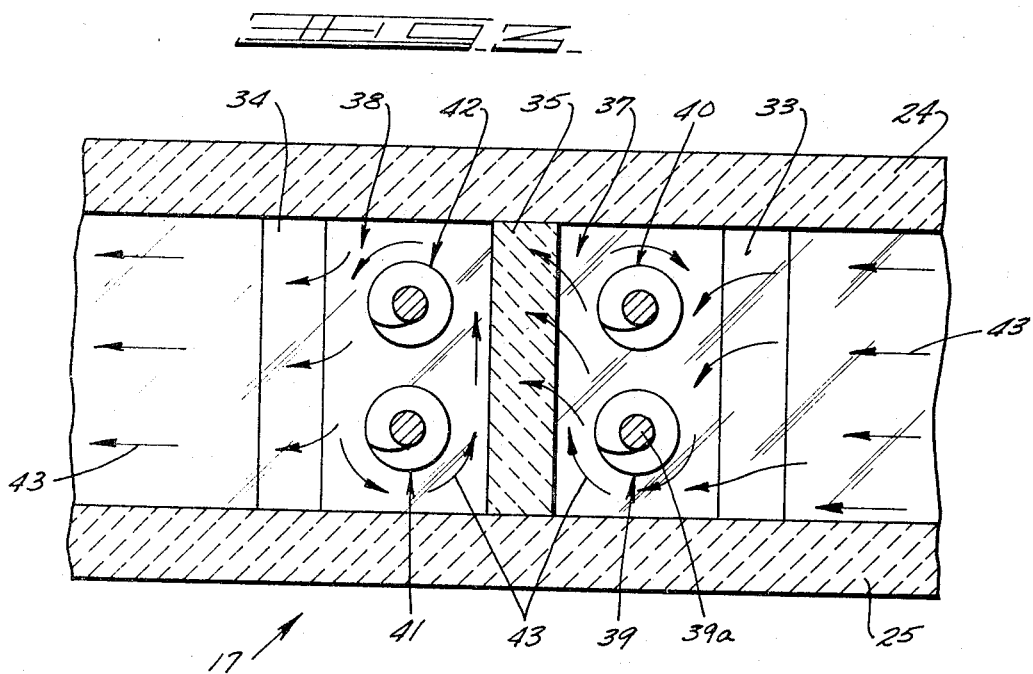
INVENTOR.
ROBERT R. ROUGH
BY J. R. Nelson and
W. A. Schaich
ATTORNEYS

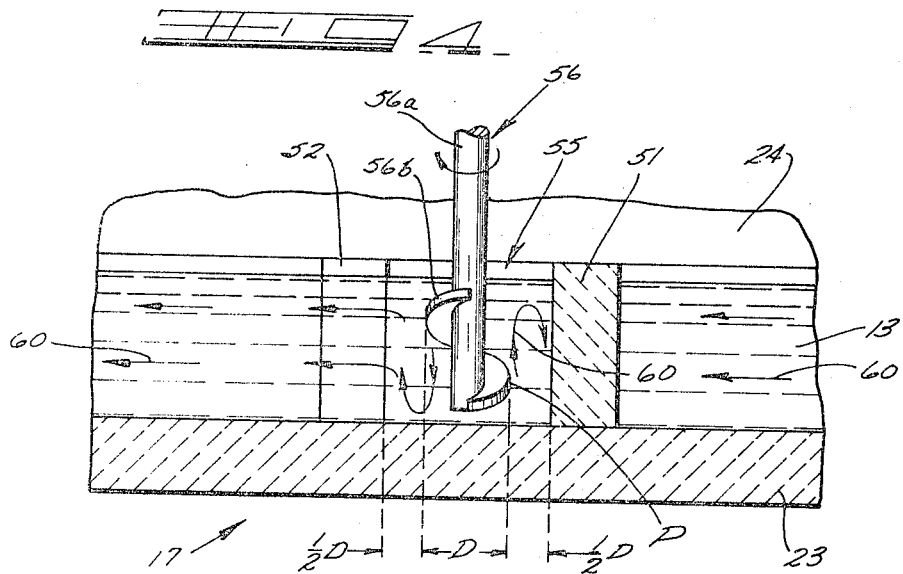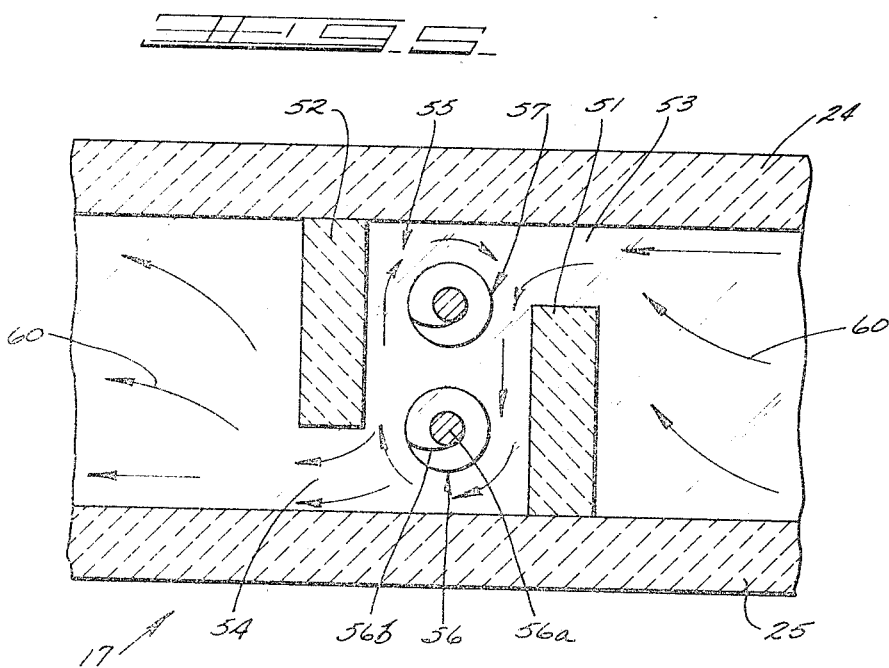

United States Patent Office 3,328,150
Patented June 27, 1967

3,328,150
APPARATUS FOR BLENDING MOLTEN GLASS
Robert R. Rough, Toledo, Ohio, assignor to Owens-Illinois, Inc., a corporation of Ohio
Filed Apr. 22, 1963, Ser. No. 274,690
7 Claims. (Cl. 65—178)

The present invention relates broadly to the art of glass manufacture. More particularly, the present invention relates to novel methods and apparatus designed to provide an optimum degree of blending and mixing of the molten glass as it is conveyed in a forehearth, channel, or the like.

It is generally recognized that molten glass as it is being conveyed from the glass melting tank to the forming machines is possessed of a fair degree of inhomogeneity or inconsistency. This defective condition is due to several phenomena. One constitutes the chemical reactions taking place in the melting operation involving the mutual dissolution of different silicates in each other, which reactions give off by-products productive of such defects. Another cause of inconsistencies involve the foreign impurities present in normal batch ingredients. Additionally the temperature conditions may vary within the flowing stream of glass due to the cooling effect caused by contact of the peripheral portions of the flowing stream with the refractory constituting the channel body resulting in heat loss. It is desirable that these inhomogeneities and discontinuities, which are frequently referred to as seeds, stones, striae, mares tails, and the like, be eliminated by efficient blending, homogenization or mixing, as these operations are referred to generally in the art.

Mixing and/or blending is also resorted to in order to achieve an intimate and complete distribution of added coloring oxides in the molten glass in order that the coloration of the molten glass by the time it reaches the delivery or forming end of the forehearth or channel will be substantially uniform.

Various methods and apparatus for achieving mixing, blending or homogenization have been resorted to in the past, but most of them have certain shortcomings ranging from incomplete mixing to too violent a mixing whereby the very defects, which are intended to be eliminated, are in fact exaggerated and increased. A violent mixing, for example, may result in breaking off of pieces of the refractory mixing element, increasing the amount of impurity in the molten glass. Furthermore, this necessitates expensive downtime to replace broken stirrer elements.

It is a principal object of the present invention to provide a novel, modified forehearth construction which operates cooperatively with a particular stirrer arrangement, in accordance with the present invention, to yield the optimum of blending or mixing of the molten glass with a minimum of turbulence and cavitation phenomenon which is frequently attendant efficient mixing.

It is also an object of the present invention to provide a novel stirrer arrangement and installation thereof to the end that a stream of molten glass flowing in a channel forehearth containing such stirrer is found to be, upon passage through said arrangement, remarkably free of defects, such as stones, striae, cords and other evidences of inhomogeneity.

It is likewise an object of the present invention to provide a combined channel forehearth and stirrer arrangement which cooperates in effecting a more efficient blending of the molten glass than has been possible heretofore, such being accomplished at a minimum of power.

It is a further object of the present invention to provide a stirrer arrangement coacting with a modified forehearth construction whereby colorant distribution and consequent uniform coloration of glass is achieved to a degree unsurpassed to the present time, all without the problems normally attendant such efficient mixing.

It is a particular object of the present invention to provide a forehearth construction definitive of essentially independent zones defining a path for glass flow, which operating in conjunction with particular stirrer arrangements will conjointly give a maximum of non-turbulent shear forces in a confined space whereby efficiency of mixing is increased.

It is also an object of this invention to provide a unique method of conducting molten glass in a prescribed path while simultaneously subjecting the glass while in such path to a prescribed and controlled circulatory mixing action, unlike any practiced hereinbefore.

It is also an object of this invention to provide such a method which accomplishes an unusually high degree of elimination of defects, such as cords, striae, seeds and other manifestations of defective and incomplete mixing.

The foregoing and other objects of the present invention will become apparent to those skilled in the art from the following detailed description taken in conjunction with the annexed sheets of drawings in which there is presented, for purposes of illustration only, several embodiments of the present invention.

In the drawings:

FIG. 1 is a longitudinal elevation view of a furnace tank and forehearth, partly in section; the forehearth including modification and stirrer arrangements in accordance with one embodiment of the present invention.

FIG. 2 is an enlarged view of one segment of the forehearth length, namely, that segment which is inclusive of the structural modifications in construction and the stirrer arrangements representing a preferred embodiment of the present invention.

FIG. 3 is a top plan view of the segment shown in FIG. 2.

FIG. 4 is an enlarged view, very similar to that of FIG. 2, but representing and depicting a forehearth modified construction in accordance with another embodiment of the present invention.

FIG. 5 is a top plan view of the segment of the forehearth shown in FIG. 4.

In its simplest embodiment, the apparatus of the present invention constitutes a modified channel construction inclusive of several obstruction members causing the molten glass to pass sequentially through several distinct zones, and an arrangement of stirrer members within said zones which is dictated to imparting a maximum of shearing forces to the glass flowing therethrough where efficiency of blending and mixing is at an optimum.

In more particular specific and preferred constructions, there is prescribed a particular plural stirrer arrangement whereby one set of stirrers will be rotated to augment the flow of molten glass through the confined zone, while another array of stirrers will be controlled to impede the flow of glass through the channel, all to the end of improving mixing efficiency.

It is a particular feature of the present invention that it is found to be most eminently desirable for the stirrer location and dimensions to bear a definite relationship in terms of the spacing from the surfaces of either the side walls of the channel, forehearth or of the obstructions constituting the modified forehearth construction in accordance with the broader aspects of the present invention.

The apparatus and method of stirring, in accordance with this invention, will become more apparent from the following detailed description where, with particular reference to the drawings, there is shown in FIG. 1 a glass melting tank 11 containing a mass of molten glass 13 to a depth such that it flows laterally through an opening 15 in the side vertical wall of the glass melting tank 11. The glass 13 upon flowing through the opening 15 passes into the forehearth channel 17 resting on support members S, from which forehearth the molten glass flows out the opening 19, as controlled by a vertically reciprocable plunger 21 adapted to reelease a gob G of molten glass as desired by the forming operation. It will be appreciated that the forehearth 17, as described hereinafter, may be utilized to convey molten glass to other glass forming operations, but a gob forming operation is illustrated herein for the sake of simplicity.

The forehearth 17 is inclusive of a bottom wall 23 composed of a refractory resistant to the molten glass and being insulative in character. The forehearth channel 17 also includes refractory top wall 22 and side walls 24 and 25 (FIG. 3), the latter being broken away as at 26 in order to show the interior of the forehearth 17 and the structural modifications and stirrer arrangement of the invention. The bottom and side walls are definitive of an elongated chamber 27 which encloses and defines the path of the molten glass in its lateral passage therethrough. As the molten glass 13 passes from the opening 15, it passes beneath a supply tube 29 which is connected to a vari-feed supply hopper, not shown, containing a supply of colorant in granular form which, as shown, is allowed to fall into the molten glass. Gas firing burners 31 project a flame laterally across the top of the molten glass to control the temperature within the forehearth channel.

In accordance with one embodiment of the invention, I modify the forehearth construction and consequently the flow of the glass therethrough in the following fashion. A pair of channel traversing dam members 33 and 34 are located on the bottom wall 23 in upstanding spaced parallel relationship. Additionally, provision is made for a vertically adjustable (see arrows) depending skimmer bar 35 to project downwardly beneath the level of the flowing glass 13. The depending skimmer bar 35 is mounted for vertical adjustment so that the space between the bottom edge 35a and the bottom wall 23 can be varied at will and as desired. The skimmer bar 35 is located generally midway between the dam members 33 and 34, defining two spaced zones 37 and 38 on either side of the skimmer bar 35. Into each of these zones or compartments 37 and 38, there is positioned respectively a pair of vertically shiftable stirrer members 39 and 40 in side-by-side relationship, and a like pair of stirrers 41 and 42 in side-by-side relationship. The stirrers are identical in construction. Each pair is located on an imaginary line normal to the longitudinal axis of the forehearth 17. The stirrer 39, for example, is composed of a circular or cylindrical shaft 39a, about which is wrapped for one full turn a spiral blade or fin elements 39b. The stirrer has the appearance of an exaggerated screw.

The stirrer for a commercial size forehearth installation may be composed of a cylindrical shaft having a diameter of about 3", with the spiral fin or thread having a lateral extent of 1½", whereby the major diameter of the stirrer will constitute 6", corresponding to the distance "D" (FIG. 2). The spiral blade or fin element in proceeding through the one 360° turn describes a vertical dimension or pitch of about 7".

In the embodiment construction shown in FIGS. 2 and 3, the stirrers 39 and 40 are rotated in a clockwise direction, while the stirrers 41 and 42 are rotated in a counterclockwise direction. The flow of the glass with this arrangement from right to left is shown by reference to the arrows 43. Thus, the glass path is first generally horizontal, then proceeds up and over the dam member 33 and down into compartment 37, where the glass is contacted by the coacting stirrers 39 and 40 rotating clockwise in such fashion that the spiral blades of each are urging the glass upwardly or, in other words, impeding the normal flow of the glass downwardly and laterally beneath the skimmer 35. The path then leads into the compartment 38 for the contact of the glass by the stirrers 41 and 42, whose rotation is counterclockwise in such fashion that the glass is urged downwardly from its normal flow pattern up and over the dam member 34 from which it proceeds laterally downstream to the delivery end. As indicated hereinabove, it is a salient feature of the present invention that the stirrers are located in such fashion that the spacing between the stirrers and adjacent surfaces of the dams, skimmers or side walls bears a definite relationship to the dimension of the stirrer itself. This relationship is illustrated in particularity in FIG. 2. Thus, the major diameter of the stirrer 39 is designated by the dimension identified by the reference letter D. The shaft 39a thereof is located midway between the dam members 33 and 35, and these in turn are so spaced that the distance between the outer periphery P of the blade or fin 39b and the facing surface of the dam 33a is just on-half of the diameter D. The same spacing exists for stirrers 40, 41 and 42 with regard to cooperating surfaces of the skimmer 35, dam 34 and side walls 24 and 25, as the case may be. It has been found that if this spacing is maintained constant for all of the stirrers and the adjacent surfaces, the stirrer can be rotated at a speed between 12 and 36 revolutions per minute and the optimum in stirring efficiency will be achieved. Most preferably, with the construction modifications as described herein and the stirrer arrangement as just hereinabove described, a stirrer rotation of 24 r.p.m. is ideally suited for the accomplishment of the objects of this invention.

Under certain circumstances, as dictated by the thermal conditions, the flow rate and/or other factors, I may rotate the stirrers in an opposite direction from that illustrated in FIGS. 2 and 3. Thus, the stirrers 39 and 40 may be rotated in a clockwise direction as shown and, at the same time, the stirrers 41 and 42 are rotated in a clockwise direction whereby the normal flow of glass is not impeded but augmented while in the chamber 38. On the other hand, under a different set of circumstances, the stirrers may be controlled so that they all rotate in a counterclockwise direction whereby the set of stirrers 39 and 40 will be urging the glass downwardly in the normal direction of flow in compartment or zone 37, whereas the set of stirrers 41 and 42 will be impeding the flow of glass in its upward travel over the dam 34 while in compartment or zone 38.

It will also be appreciated that under certain circumstances I may modify the forehearth channel construction by providing spaced skimmer bars in the same location as the dams 33 and 34 and utilize a dam in place of the skimmer 35. The flow of glass in such situation will be downwardly, then upwardly, then downwardly, rather than as shown in FIG. 2 where the flow of glass is upwardly, then downwardly under the skimmer 35, and thence upwardly over the dam 34. By the same token, I will employ stirrer rotation and vertical positioning to meet the exigencies existing by reason of the thermal condition, the amount of colorant, the flow rate, the pull of the forming machines, etc.

There is disclosed in FIGS. 4 and 5 a segment of a forehearth 17 similar to that shown in FIGS. 2 and 3, but representing a modified construction representing another embodiment of the present invention. This segment of the forehearth channel is defined principally by a bottom wall 23 and connected thereto spaced parallel upstanding side walls 24 and 25. In this modified forehearth construction, there is employed a pair of diverter members 51 and 52. Diverter 51 is connected to the bottom wall 23 and side wall 25 and extends laterally across the width of the channel but short of the side wall 24, leaving a passageway 53. Conversely, diverter 52, although connected to the bottom wall 23, extends from side wall 24 substantially across the channel, but short of the side wall 25, leaving a passageway 54. The diverters upstand from the bottom wall to a height greater than the depth of the molten glass 13.

The diverters 51 and 52 are generally parallel and define therebetween a zone or chamber 55 having, by reason of the diverter construction and arrangement, an inlet 53 and an outlet 54 in offset relationship. In the zone or chamber 55, there is located a pair of stirrers 56 and 57 in side-by-side relationship on an imaginary line normal to the longitudinal axis of the forehearth channel. The stirrers 56 and 57 are identical to the stirrers 39, 40, 41 and 42 disclosed and discussed in connection with FIGS. 2 and 3. In this particular embodiment, the stirrers 56 and 57 are rotated clockwise, whereby the integral spiral fin members 57a and 56a respectively urge the molten glass contacted thereby upwardly. The flow of the molten glass 13 through the modified channel forehearth construction and stirrer arrangement, as just described, is shown graphically by the flow arrows designated by the reference numeral 60. As can be seen, the normally linear flow of the molten glass is interrupted by the first diverter so that it must pass confiningly through the passageway 53 into the compartment 55 whereby it is contacted by the rotating stirrers 56 and 57, which members urge the glass in a fashion represented by the arrows, from which zone the glass must pass confiningly to the left through the narrow passageway 54, thence passing into the normal lateral span of the channel, defined by the spaced side walls 24 and 25. As in the embodiment illustrated in FIGS. 2 and 3, the diverters are so located and the stirrers so selected as to size and location that the outer periphery of the spiral blade 56b is spaced, from the surfaces of the diverters and side walls, a distance of one-half of the major diameter of the stirrer. This is illustrated in FIG. 4 wherein the major diameter is designated by the reference letter D, and the dimension between the periphery P and the side diverter 51 designated by the reference numeral and letter "½ D."

The flow of the molten glass in the modified forehearth construction, in accordance with FIGS. 4 and 5, is generally analogous to the flow in the modified forehearth construction of FIGS. 2 and 3 in that the molten glass is forced to a substantial degree from its normal linear flow path through the forehearth and caused to pass into a zone wherein appreciable but non-turbulent stirring forces exist. The glass is then forced into an additional substantial departure from normal flow, through the passage 54, followed by the sudden release into the normal span of the forehearth channel. The stirring action may be defined as a generally rigorous and positive but non-turbulent circulatory motion.

The modified forehearth construction and stirrer arrangement disclosed in FIGS. 2 and 3 is the most preferred of the embodiments disclosed, illustrated and described herein, since the degree of mixing and efficiency thereof is found to be most pronounced, whereby elimination of discontinuities, inhomogeneities, cords, striae and the like are most pronounced and distribution of colorant is accomplished to a higher degree. On the other hand, the embodiment of FIGS. 4 and 5 is advantageous, since it is relatively simple in terms of modifications required and necessitates employment of fewer stirrers. As a consequence, it is a less expensive installation and is usually sufficient for the usual forehearth installation.

The practice of the present invention involves a novel method of molten glass flow control and mixing. Thus, the molten glass is so conducted that it experiences several appreciable changes in flow path and is simultaneously subjected while undergoing said change to a mixing characterized by positive but non-turbulent circulatory motion. Preferably, the mixing is accomplished in a zone of appreciably limited space in relation to the stirrer dimension. Most ideally, the method takes the form of conducting the glass through the several changes of direction and subjecting the molten glass to separate and distinct zones of mixing as described herein.

Modifications may be resorted to without departing from the spirit and scope of the present invention as defined in the appended claims.

I claim:
1. In a forehearth for conveying molten glass from a glass melting furnace to a gob forming device, the improvement for imparting mixing which comprises in combination therewith three spaced obstructions having vertical facing surfaces and being constructed and arranged to define therebetween two zones characterized by a molten glass flow path representing an appreciable departure from normal linear flow in said channel, and a plurality of rotatable, screw-thread type stirrers situated in each of said zones so that the distance between the facing surfaces of said obstructions and the periphery of said stirrers measures about one-half of the major diameter of said screw-thread type stirrer.

2. A forehearth for conveying molten glass laterally from a glass melting furnace to a gob forming device, said forehearth comprising a principal elongate channel having a bottom wall and connected upstanding side walls, said forehearth embodying improved mixing capabilities imparted by a construction which includes a first obstruction forcing said glass to depart vertically from normally horizontal flow in said forehearth, a second obstruction spaced from said first obstruction forcing said glass to depart vertically from normally horizontal flow, and located between said obstructions at least one rotatable stirrer member of the screw-thread type, said stirrer being spaced from the nearest facing surfaces of said obstructions by a distance measuring about one-half the major diameter of said screw-thread type stirrer.

3. A forehearth for conveying molten glass from a glass melting furnace to a gob forming device, said forehearth comprising a principal elongate channel having a bottom wall, connected upstanding side walls, and including an upstream inlet end and a downstream outlet end leading to said gob forming device, a first channel-traversing dam member upstanding from said bottom wall thereby forcing glass to flow upwardly thereover and down, a channel-traversing skimmer member spaced downstream from said first dam member thereby forcing glass to flow downwardly thereunder, a second channel-traversing dam member spaced downstream and upstanding from said bottom wall thereby forcing glass to flow upwardly thereover, and located in each of the zones between said members at least two rotatable stirrer members of the screw-thread type, said stirrers being so spaced that the lateral distance between the outer peripheries of the stirrers and adjacent surfaces of said members measures about one-half the major diameter of said screw thread type of stirrer member.

4. A forehearth construction as claimed in claim 3, wherein said stirrer members of the screw thread type each have a major overall diameter of about six inches including a shaft diameter of about three inches and a spiral fin extension measuring about one and one-half inches.

5. A molten glass conveying forehearth comprising:
an elongate channel having a bottom wall and upstanding side walls marginally connected to said bottom wall, said channel having an upstream inlet end and a downstream outlet end leading to a gob forming device, said forehearth having improved mixing capabilities imparted by a construction which includes:
three generally equally spaced obstructions located in parallel relationship normal to and spanning said side walls, said obstructions being either upstanding dams projecting upwardly from the bottom wall or depending skimmers extending downwardly into the path of molten glass,
the first and third of said obstructions being the same type while the second obstruction is the other type of obstruction,
a first array of screw thread type stirrers located between the first and second obtructions, said stirrers being located on an imaginary line midway between and parallel with said obstructions, a second array of screw thread type stirrers located between the second and third obstructions, said stirrers being located on an imaginary line midway between and parallel with said obstructions, and
means for rotating said stirrers in either direction.

6. A molten glass conveying forehearth comprising:
an elongate channel having a bottom wall and upstanding side walls marginally connected to said bottom wall, said channel having an upstream inlet end and a downstream outlet end leading to a gob forming device, said forehearth having improved mixing capabilities imparted by a construction which includes:
three generally equally spaced obstructions located in parallel relationship normal to said side walls,
the first and third of said obstructions each being upstanding dams projecting upwardly from the bottom wall,
the second of said obstructions being a depending skimmer extending downwardly into the path of molten glass,
a first array of screw thread type stirrers between the first and second obstructions, said stirrers being located on an imaginary line midway between and parallel with the adjacent obstructions,
means for rotating said first array of stirrers in either direction,
a second array of screw thread type stirrers between the second and third obstructions, said stirrers being located on an imaginary line midway between and parallel with said obstructions, and
means for rotating said second array of stirrers in either direction.

7. A molten glass conveying forehearth comprising:
an elongate channel having a bottom wall and upstanding side walls marginally connected to said bottom wall, said channel having an upstream inlet end and a downstream outlet leading to a gob forming device, said forehearth having improved mixing capabilities imparted by a construction which includes:
three generally equally spaced obstructions located in parallel relationship normal to said side walls,
the first and third of said obstructions each being a depending skimmer extending downwardly into the path of said molten glass,
the second of said obstructions being an upstanding dam projecting upwardly from the bottom wall,
a first array of screw thread type stirrers between the first and second obstructions, said stirrers being located on an imaginary line midway between and parallel with the adjacent obstructions,
means for rotating said first array of stirrers in either direction,
a second array of screw thread type stirrers between the second and third obstructions, said stirrers being located on an imaginary line midway between and parallel with said obstructions, and
means for rotating said second array of stirrers in either direction.

References Cited

UNITED STATES PATENTS

| | | | |
|---|---|---|---|
| 2,707,621 | 4/1955 | Peiler | 65—134 |
| 3,057,175 | 10/1962 | Rough et al. | 65—178 |
| 3,216,812 | 11/1965 | Silverman | 65—179 |
| 3,224,857 | 12/1965 | Allmen et al. | 65—178 |

DONALL H. SYLVESTER, *Primary Examiner.*

S. LEON BASHORE, D. CRUPAIN,
*Assistant Examiners.*